Aug. 6, 1940.  F. J. KURTH  2,210,589

COMBINED AIR DISTRIBUTING AND ILLUMINATING DEVICE

Filed Feb. 8, 1938

INVENTOR
FRANZ J. KURTH.

BY
ATTORNEY

Patented Aug. 6, 1940

2,210,589

UNITED STATES PATENT OFFICE 2,210,589

COMBINED AIR DISTRIBUTING AND ILLUMINATING DEVICE

Franz J. Kurth, New York, N. Y., assignor to Anemostat Corporation of America, a corporation of Delaware Application February 8, 1938, Serial No. 189,386

4 Claims. (Cl. 240—78)

My invention relates to air distributing and ventilating devices and more especially of the type whereby air is introduced into and circulated in rooms, or other closed spaces, without any sensation of draft being experienced by the occupants of the room which is accomplished by the incoming flow of air being divided into a plurality of separate air currents flowing in various directions with gradually reduced energy.

More particularly, my invention relates to ventilating devices of this type having combined therewith illuminating means, e. g. light fixtures, in such a way that they constitute an inherent part of the ventilating device, such as I have shown and described in my application, Serial No. 12,194, filed on March 21, 1935, now Patent No. 2,131,054, dated Sept. 27, 1938.

As stated in my said application, it is one of the objects of my invention to so design the combined ventilating and illuminating device that a portion of the incoming ventilating air will be circulated around the light giving elements, e. g. bulbs, etc., to thereby carry away the heat generated thereby.

It is also an object of this invention to so locate the light fixtures as to make them readily accessible at all times for any necessary repairs or the exchange of the illuminating elements, e. g. bulbs, etc.

It is a further object of this invention to so design a portion or portions of the air distributing and ventilating device that they will conceal the illuminating elements combined with the ventilating device at the same time acting as reflectors for the same.

Figure 1:
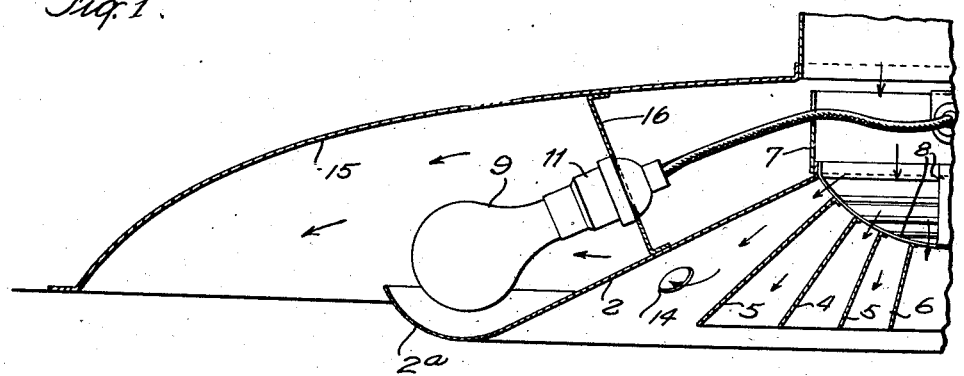
Figure 2:
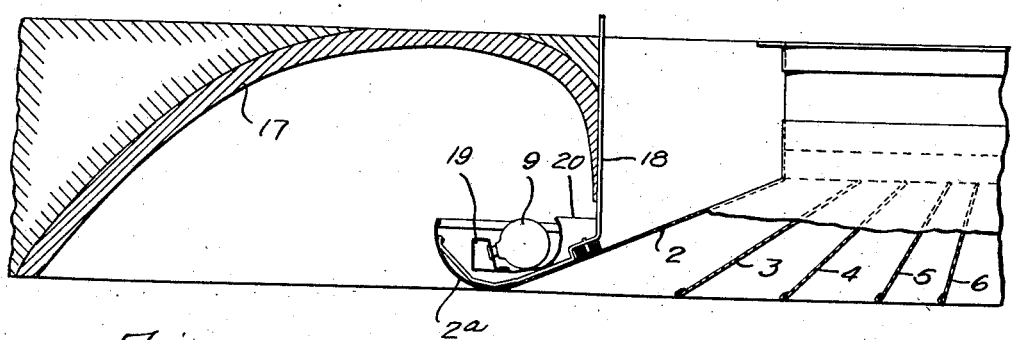

With these and other objects in view, the present invention consists of the combination of parts hereinafter described and more fully set forth in detail with reference to the appended drawing, wherein Fig. 1 is a sectional view of a combined ventilating and illuminating device embodying the features of this invention, while Fig. 2 is a similar view as Fig. 1 showing a modification.

The air distributing or ventilating device shown in the drawing comprises a plurality of individual open-ended hollow flaring members of gradually decreasing size shown at 2, 3, 4, 5 and 6, which members are spaced one from the other and are so disposed as to form air passageways of gradually increasing cross-sectional areas. As shown in the drawing, the largest of the hollow flaring members, i. e. member 2, is secured to, or if desired made integral with, a tubular part shown at 7, which in turn is connected with or inserted into an air supply conduit (not shown) through which air is supplied to the several air passageways formed by and between said hollow flaring members 2, 3, 4, 5 and 6, the air flowing out in the direction of the arrows.

The hollow flaring members 3, 4, 5 and 6 are connected with the largest flaring member 2 carried by the tubular part 7 and with each other by stays or braces, one of which is shown at 8 in the drawing.

According to the embodiment shown in Fig. 1, the lower edge or rim of the largest hollow flaring member 2 is extended to form an upwardly curved trough-shaped portion designated 2ª which partly surrounds the projecting portions of the light bulbs 9 so as to conceal the same from view. The inner surface of this trough-shaped extension 2ª may be silvered or enameled or only highly polished so as to act as a reflector throwing the light rays emanating from the bulbs 9 upwards, with the result that a uniform smooth light effect is insured.

This is still further enhanced by the ceiling portion of the fixture being given a parabolic shape as shown at 15 in Fig. 1.

The lamp-sockets 11 in this embodiment are supported in bridge-pieces 16 extending at suitable intervals from the outer surface of the largest hollow flaring member to the parabolic ceiling portion of the fixture, thus permitting ready access to the bulbs 9.

In the member 2 are holes 14 to provide for free circulation of air from the passageway between the members 2 and 3 around the light bulbs 9 to carry away heat generated by said bulbs.

While the embodiment of the invention shown in Fig. 1 is designed more especially for use in cars, the embodiment shown in Fig. 2 is designed for use in the ceiling of a room. In this case, the ceiling immediately surrounding the distributing and ventilating device is recessed as shown at 17 so as to form a parabolic curve. As in Fig. 1 the outer rim of the largest flaring member 2 is extended and curved upwards so as to receive in a concealed position the light bulbs, one of which is shown at 9; disposed at suitable intervals along the outer circumference of the hollow flaring member 2. Special brackets shown at 18 are provided for supporting the air distributing and ventilating device, while at 19 is shown one of several socket members provided at intervals for receiving the light bulbs 9. At 20 is shown a curved reflector for reflecting the light of the light bulbs upwards against the parabolic curve of the recessed ceiling.

While I have shown and described some embodiments of my invention, I do not, of course, limit myself thereto, since they are capable of changes and modifications falling within the scope and essence of this invention.

I claim:

1. A circular combined air distributing and illuminating device comprising a plurality of successively larger, hollow, frustro-conical members open at their ends and disposed in spaced relationship to provide a series of air passageways therebetween, the forward marginal portion of the larger of said flaring members being curved rearwardly, an electric lamp disposed behind and shielded from view by the rearwardly curved marginal portion of the larger of said members, and a parabolic ceiling surface behind said lamp disposed to reflect light from said lamp forwardly and outwardly relative to the device.

2. A combined air distributing and illuminating device comprising a plurality of successively larger, hollow, flaring members open at their ends and disposed in spaced apart relationship to provide a series of air passageways therebetween, a parabolic light reflecting element behind and spaced from the larger of said flaring members, a member connecting said light reflecting element to the larger of said flaring members and holding said larger flaring member and said element in spaced apart relationship, a lamp socket mounted in said connecting member, and a lamp mounted in said socket and disposed behind and shielded from view by the larger flaring member.

3. A combined air distributing and illuminating device comprising a plurality of successively larger, hollow, flaring members open at their ends and disposed in spaced apart relationship to provide a series of air passageways therebetween, a parabolic light reflecting surface behind and spaced from the larger of said flaring members, a lamp support mounted on the larger of said flaring members at the rear thereof, a lamp socket and a lamp carried by said support, and a light reflector also mounted on said larger flaring member at the rear thereof and formed and disposed to reflect light from said lamp rearwardly and outwardly upon said parabolic surface for forward and outward reflection by the latter.

4. A combined air distributing and illuminating device as set forth in claim 3 in which the lamp support and the light reflector are in the form of a one-piece, sheet metal unit.

FRANZ J. KURTH.